(12) United States Patent
Salzer et al.

(10) Patent No.: US 7,440,033 B2
(45) Date of Patent: Oct. 21, 2008

(54) VECTOR BASED MOTION COMPENSATION AT IMAGE BORDERS

(75) Inventors: Sven Salzer, Butzbach (DE); Michael Grundmeyer, Mainz (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 556 days.

(21) Appl. No.: 11/086,371

(22) Filed: Mar. 23, 2005

(65) Prior Publication Data

US 2005/0231644 A1 Oct. 20, 2005

(30) Foreign Application Priority Data

Mar. 30, 2004 (EP) .................................. 04007697

(51) Int. Cl.
H04N 7/01 (2006.01)
H04N 11/20 (2006.01)
H04N 5/14 (2006.01)

(52) U.S. Cl. ..................... 348/458; 348/701; 348/441; 348/913

(58) Field of Classification Search ......... 348/699–701, 348/448, 452, 458, 441, 445, 558, 449, 913; 382/298–300
See application file for complete search history.

(56) References Cited

U.S. PATENT DOCUMENTS

| | | | |
|---|---|---|---|
| 4,496,972 A | | 1/1985 | Lippmann et al. |
| 5,475,446 A | * | 12/1995 | Yamada et al. ............. 348/699 |
| 5,754,243 A | * | 5/1998 | Kurihara et al. ............ 348/445 |
| 6,208,385 B1 | * | 3/2001 | Konishi et al. ............. 348/558 |
| 6,330,037 B1 | | 12/2001 | Nakajima et al. |
| 6,370,192 B1 | | 4/2002 | Pearlstein et al. |
| 6,567,128 B1 | * | 5/2003 | Webb et al. ................ 348/584 |
| 6,728,317 B1 | * | 4/2004 | Demos .................. 375/240.21 |
| 2002/0085096 A1 | | 7/2002 | Mertens et al. |
| 2002/0110197 A1 | | 8/2002 | Pearlstein et al. |
| 2003/0206246 A1 | | 11/2003 | De Haan et al. |

(Continued)

FOREIGN PATENT DOCUMENTS

GB 2110046 6/1983

(Continued)

OTHER PUBLICATIONS

Robert Thoma et al., "Motion Compensating Interpolation Considering Covered and Uncovered Background", Signal Processing Image Communication, Elsevier Science Publishers, Amsterdam, NL, vol. 1, No. 2, Oct. 1, 1989, pp. 191-212, XP000234868, ISSN: 0923-5965, abstract.

(Continued)

Primary Examiner—Victor R Kostak
(74) Attorney, Agent, or Firm—Wenderoth, Lind & Ponack, L.L.P.

(57) ABSTRACT

The present invention relates to an improved interpolation based on motion compensation. In order to avoid interpolation artifacts in proximity to the image borders, in particular in letterbox type images, each motion compensated image data is subjected to a position validation in order to determine whether or not the motion compensated image data can be used for interpolation purposes. By comparing the position of the motion compensated image data in the referenced images with predefined borderlines, impermissible image data positions can be detected and interpolation based on such image data prevented.

37 Claims, 5 Drawing Sheets

U.S. PATENT DOCUMENTS

2004/0101058 A1* 5/2004 Sasai et al. ............. 375/240.26
2004/0252759 A1* 12/2004 Winder et al. .......... 375/240.12

FOREIGN PATENT DOCUMENTS

GB 2286500 8/1995
WO 94/19905 9/1994

OTHER PUBLICATIONS

A. Pelagotti et al., "High quality picture rate up-conversion for video on TV and PC", Proceedings of the Philips Conference on Digital Signal Processing, Nov. 1999, XP002194767, Veldhoven, NL.

* cited by examiner

VECTOR BASED MOTION COMPENSATION AT IMAGE BORDERS

BACKGROUND OF THE INVENTION

The present invention relates to an improved motion compensation method. In particular, the present invention relates to a method for generating new image data based on motion compensated data of other images and to a corresponding motion compensator.

Motion compensation is employed in an increasing number of applications, in particular in digital signal processing of up-to-date television receivers. Specifically, modern television receivers perform a frame-rate conversion, especially in a form of a motion compensated up-conversion, in order to increase the picture quality of the reproduced images. Motion compensated up-conversion is performed, for instance, for video sequences having a field or frame rate of 50 Hz to higher frequencies like 60 Hz, 66.67 Hz, 75 Hz, 100 Hz, etc. While a 50 Hz input signal frequency mainly applies to television signals broadcast in accordance with PAL or SECAM standards, NTSC based video signals have a field rate of 60 Hz. A 60 Hz input video signal may be up-converted to higher frequencies like 72 Hz, 80 Hz, 90 Hz, 120 Hz, for example.

Frame rate conversion algorithms require the generation of intermediate images which reflect the video content at temporal positions different from that of the input video sequence of, for instance, 50 Hz or 60 Hz. During interpolation of image data of the input images, the motion of moving objects has to be taken into account in order to appropriately reflect changes of the image content caused by object motion.

The motion to be used during interpolation of the image data is determined based on the two closest images of the input video sequence. Generally, motion estimation is performed on a block basis. In order to avoid visible block structures in the motion compensated images, the motion vectors determined on a block basis are preferably assigned to each individual pixel wherein the resulting field of motion vectors is subjected to filtering.

Specifically, each image block receives a motion vector estimated on the basis of the input images. To avoid visible block structures in motion compensation, these blocks are filtered in a block erosion unit. The filter recursively divides in a multi-step processing each block into a number of sub-blocks and assigns a motion vector to each sub-block. After the last step of block erosion, a separate motion vector is assigned to each pixel position in the image to be interpolated. In accordance with the assumption that noticeable moving objects cover an area of several pixels and object motion is uniform, no vector assignment to the exact pixel position is required. Otherwise, a shift of the starting point of the motion vector towards the landing point in relation to the temporal position of the output image to the adjacent input images is necessary. In accordance with the received motion vector, motion compensation shifts the image data of the pixel referenced by the motion vector. The amount of shifting image data of the referenced images does not only depend on the length of the received motion vector, but further depends on the relative temporal position of the new image to be generated between the previous and subsequent images.

When generating new image data from two images, preferably the previous and subsequent images, the motion compensation algorithm references image data in the previous and the subsequent images. While the image data from the previous image is shifted forward in the motion vector's direction, the image data from the subsequent image is shifted backwards. The amount of forward and backward shift is determined in accordance with the temporal position of the new image with respect to the referenced images. While the shift of the forward shift is executed in accordance with a calculated fraction of the motion vector's length, the backward shift is performed with the complementary negative fraction of the motion vector. The referenced pixel values at each pixel position are interpolated. The interpolation can also be based on a weighing of the image data from the referenced images based on the temporal position with respect to the newly generated image.

The picture quality achieved by such interpolation algorithms is deteriorated if the interpolated images include non-active image areas. Such non-active image areas may be employed to adapt the image format of the active image area to the display format of a display device. In particular, letterbox type images employ black bars either at the top and bottom of the image or at the left and right side thereof in order to adapt a widescreen image for display on a conventional display format or vice versa.

Image areas next to such black bars of a letterbox type image suffer from missing motion vectors. Consequently, interpolation can only be based on a weighing of the image data from the two subsequent images without reference to the true motion of objects.

Such problems mainly occur when moving objects cross the border of the active image area, in other words, an object is either moving into the image or leaving the image such that the respective image content is only present in one of two subsequent images. Such motion can not be detected by conventional motion estimation algorithms. A promising new approach for determining motion vectors for the image borders of active image areas is the application of line vectors or column vectors which reflect the predominant motion within a line or column of blocks. A motion vector for image blocks, which include parts of moving objects which cross the image border and consequently have no counterpart in the other image, can be determined based on the motion vector of the respective line or column of blocks.

However, motion compensation based on line or column motion vectors result in an interpolation of image data from outside of the active image area. Consequently, inappropriate image data is introduced into the interpolation process. Due to interpolation, image data of the active image area are interpolated with the uniformly black image data causing a respectively impaired interpolation result.

For letterbox type images, this picture quality degradation is caused by motion vectors directed into the letterbox area. Pixels from the letterbox area are combined with pixels from the active image area such that the interpolated image data include black dots stemming from the letterbox area.

SUMMARY OF THE INVENTION

The present invention aims to overcome such prior art drawbacks. It is the object of the present invention to provide an improved method for generating image data based on motion compensation and to provide a respective motion compensator.

This is achieved by the features of the independent claims.

According to a first aspect of the present invention, a method for generating image data based on a motion compensation from video data of other images in a sequence of video images is provided. After receiving a motion vector for a current image position of the image to be generated, the image data from another image referenced based on the motion vector is obtained. Further, it is determined whether or not the image data referenced based on the motion vector is located at a permissible image position. If the reference image data is positioned at an impermissible image position, the generation of new image data based on the reference image data is inhibited.

According to another aspect of the present invention, a motion compensator is provided for generating image data based on motion compensation from video data of other images in a sequence of video images. The motion compensator is adapted to receive a motion vector for a current position in the image to be generated and to retrieve image data from another image referenced based on the motion vector. The motion compensator includes an output calculator for determining whether or not the image data referenced based on the motion vector is located at a permissible image position. The output calculator inhibits the generation of new image data based on the referenced image data if the referenced image data is positioned at an impermissible image position.

It is the particular approach of the present invention that the individual position of referenced image data used for interpolation purposes is taken into account. The position of a referenced image data is compared with a predefined permissible image area. In this manner, impermissible image areas can efficiently be excluded from use in interpolation algorithms. Upon detection of a motion vector, referencing a block outside of the permissible image area, the use of such image data is inhibited and the image quality close to the borders of the permissible image area is preserved.

According to a selected embodiment, the position of a referenced image data is compared with predetermined borders defining the permissible image area. In this manner, the referenced image data is compared to a borderline and upon exceeding the predetermined border, the use of the referenced image data is prevented.

Preferably, the permissible image area is the active image area of the video image and, most preferably, the impermissible image area relates to those image portions inserted for adapting an image format of the video sequence to a display format. For letterbox type images, these impermissible image areas are black bars inserted at the top and bottom of the display format. Such letterbox type format can be easily detected and the borders set accordingly in an automated manner.

Preferably, the referenced image data which turn out to be impermissible are replaced by other image data for use in the interpolation process. In this manner, an error concealment is performed and the interpolation process maintained.

Preferably, the replacement image data is image data from a permissible position within the image referenced by the motion vector. In this manner, the temporal proximity of the referenced image data can be maintained by only correcting the referenced image position.

Preferably, the new image data are generated based on predicted image data from different images. For this purpose, two motion vectors are calculated from the received motion vector referencing different images. Image data of those image data referenced by the calculated motion vectors are obtained and interpolated in order to generate the new image data. By predicting the image data of a current block based on image data of two other referenced images, the image quality of the predicted image data can be improved considerably, in particular the flow of motion of the moving object appears with improved continuity.

Preferably, the two calculated motion vectors reference images adjacent to the current image to be generated. In this manner, changes of the image content occurring between the subsequent images can be appropriately taken into account.

Alternatively, the two calculated motion vectors reference two different previous images. In this manner, the cause of the changes of the moving object is considered appropriately.

The length of both motion vectors is preferably calculated in accordance with the temporal position of the current image to be generated with respect to the temporal position of both referenced images. In this manner, the position of the moving object within the new image to be generated is set appropriately.

Preferably, the current image data of both images are weighed and interpolated accordingly by accumulating the weighed image data. In this manner, the proportion of the image data from a current image is set in accordance with its temporal proximity to the temporal position of the newly generated image.

Preferably, the weighing factors are set in accordance with the length of the respective calculated motion vectors.

Preferably, the referenced image data of both images are median-filtered together with the weighed interpolated image data of the adjacent images to generate the interpolated image. In this manner, a possible error caused by a wrong motion vector is concealed with the weighed interpolated image data.

Those image data which are not taken into account due to an impermissible position of the referenced image data is replaced by the image data referenced by the other motion vector. In this manner, a simple error concealment with high image quality can be achieved.

Several embodiments of the present invention are the subject matter of the independent claims.

Other embodiments and advantages of the present invention will become more apparent from the following description of preferred embodiments, in which:

DETAILED DESCRIPTION OF THE INVENTION

The present invention relates to digital signal processing, especially to signal processing in modern television receivers. Modern television receivers employ up-conversion algorithms in order to increase the reproduced picture quality. For this purpose, intermediate images are to be generated from two subsequent images. For generating an intermediate image, the motion of moving objects has to be taken into account in order to appropriately adapt the object position within the new image to the point of time reflected by the intermediate image.

Like motion estimation, motion compensation is generally performed on a block basis. For this purpose, the intermediate image to be generated is divided into a plurality of blocks as illustrated, for example, in FIG. 2. Each current block is individually generated based on motion compensation of image data from a previous and a subsequent image. To avoid visible block structures in motion compensation, these blocks are filtered in a block erosion unit. The filter recursively divides in a multi-step processing each block into a number of smaller sub-blocks and assigns a motion vector to each sub-block. After the last step of block erosion a separate motion vector is assigned to each pixel.

Figure 1:
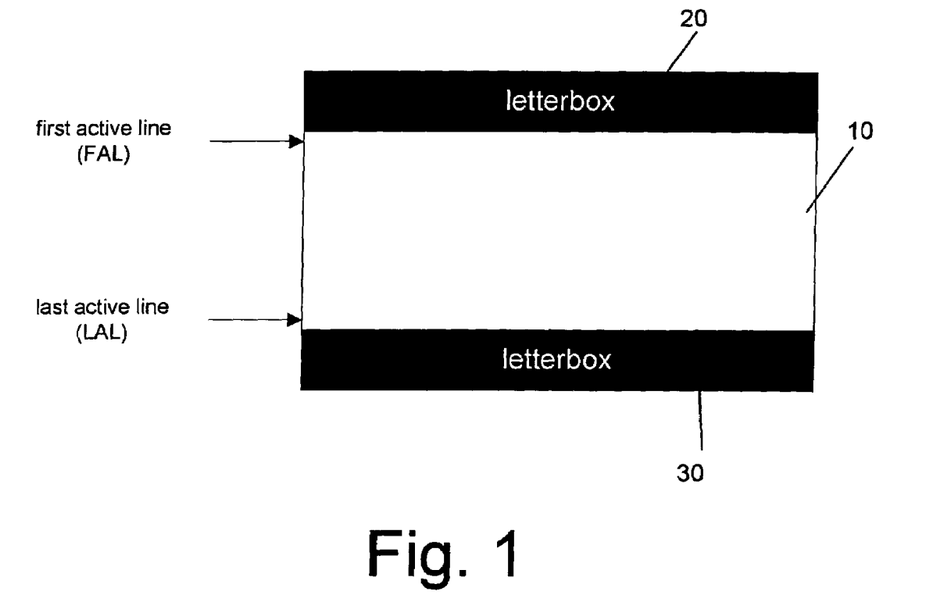
FIG. 1 illustrates an example of a letterbox type video image.

When generating motion compensated image data for letterbox type images as illustrated for example in FIG. 1, conventional interpolation algorithms do not observe the borderlines between the active image area 10 and the black bars 20, 30 provided at the top and bottom of the display format. Motion vectors which are assigned to a current block to be generated may be directed into the letterbox area 20, 30 referencing a block of completely black image data. In the same manner, motion vectors may point from the inside of the letterbox area 20, 30 into the active image area 10. These types of motion vectors introduce pixels into the interpolation process, either in form of black dots into the active image area 10 or in form of bright dots into the letterbox area 20, 30.

During motion compensation, a motion vector is assigned to a current block to be generated. The assigned motion vector is split into a positive fraction for shifting a block of image data from the previous image and into a negative fraction assigned to the subsequent image for shifting a block of image data from the subsequent image backwards. The pixel data from both referenced image blocks are interpolated and processed together with additional average pixel values from the previous and subsequent images to generate a block of image data of the interpolated image.

The present invention avoids any image quality degradation introducing image data either from the letterbox area into the active image area or vice versa by preventing letterbox pixels to be taken into account during interpolation for blocks of the active image area. In a corresponding manner, image data from the active image area are not employed for interpolation purposes in the letterbox area. This is achieved by taking the borderlines between the active image area 10 and the letterbox areas 20, 30 into account. The borderlines are marked as the first active line (FAL) and the last active line (LAL) of the letterbox type image illustrated in FIG. 1. These borderlines may be automatically detected as described for instance in U.S. Pat. No. 6,208,385A and are memorized for the image sequence to be processed. During motion compensation, the FAL and LAL are compared with the vertical component of the addressed pixel position.

Based on the borderlines FAL, LAL of the top and bottom letterbox areas 20, 30, the pixels of the letterbox areas 20, 30 and the active image area 10 are marked differently to control the applied interpolation. For this purpose, a binary signal LB_IN is set accordingly and assigned to each pixel.

Figure 3:
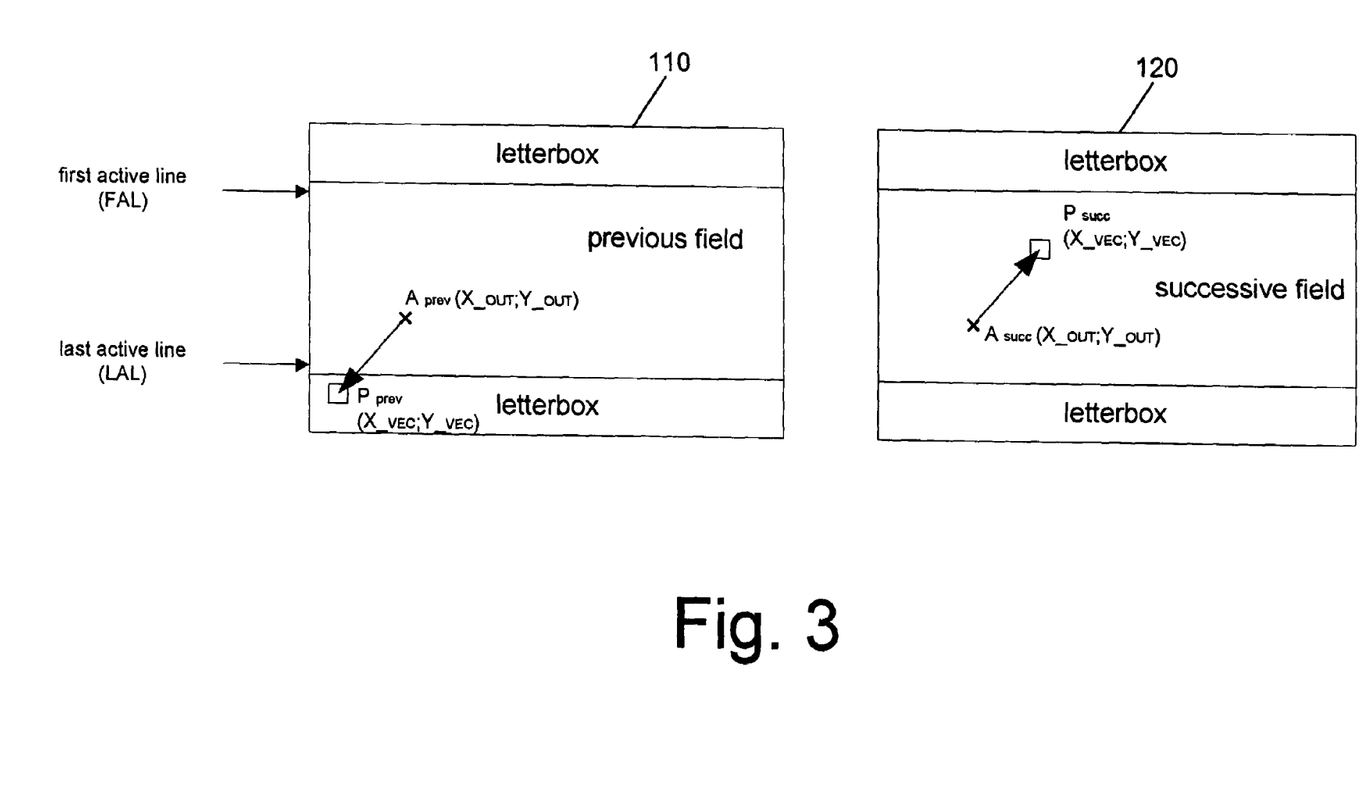
FIG. 3 illustrates the interpolation of an intermediate field based on a previous and successive letterbox type field.

The motion compensation based on a previous and subsequent field of letterbox type images 110, 120 is illustrated in FIG. 3. In order to generate a pixel at a current position A, a fraction of the received motion vector references pixels in the previous field 110 and the successive field 120 The referenced pixel positions are determined based on a received motion vector, wherein the first fraction of the motion vector references a pixel position in the previous field 110, while an inverse complimentary fraction references a block in the successive field 120.

FIG. 3 illustrates in both possible motion compensation conditions, namely an allowable and a non-allowable reference position. The image data for pixel position A in the active image area refers another pixel position $P_{succ}$ in the successive field 120 also located in the active image area 10. In contrast, in the previous field 110 the motion vector references the pixel position $P_{prev}$ located in the letterbox area 30.

The motion vector referencing the previous field crosses the last active line LAL, in other words, the border between the active image area 10 and the letterbox area 30.

Conventional interpolation algorithms combine both referenced image data to generate interpolated image data. Such an interpolation process results in a black portion introduced by pixel $P_{prev}$ from the previous field into the active image area of the newly generated image. In order to avoid such picture quality degradation, the present invention inhibits an interpolation crossing the borderline to the letterbox area. The missing image data are preferably replaced by those data which are obtained by referencing the other field, in other words, pixel position $P_{succ}$.

In order to detect whether or not a referenced pixel position impermissibly crosses the borderline between the active image area and the letterbox area, the signal LB_IN is calculated as indicated by the following equations, wherein equation (1) relates to the borderline between the active image area 10 and the bottom letterbox area 30 and equation (2) applies to the borderline between the active image area 10 and the top letterbox area 20:

IF ((($Y\_OUT <= LAL$) AND ($Y\_VEC > LAL$)) [vector points into the letterbox area]

OR (($Y\_OUT >= LAL$) AND ($Y\_VEC < LAL$))) [vector points into the active image area]

LB_IN=1;

ELSE

LB_IN=0; (1)

IF ((($Y\_OUT >= FAL$) AND ($Y\_VEC < FAL$)) [vector points into the letterbox area]

OR (($Y\_OUT < FAL$) AND ($Y\_VEC >= FAL$))) [vector points into the active image area]

LB_IN=1;

ELSE

LB_IN=0; (2)

Figure 4:
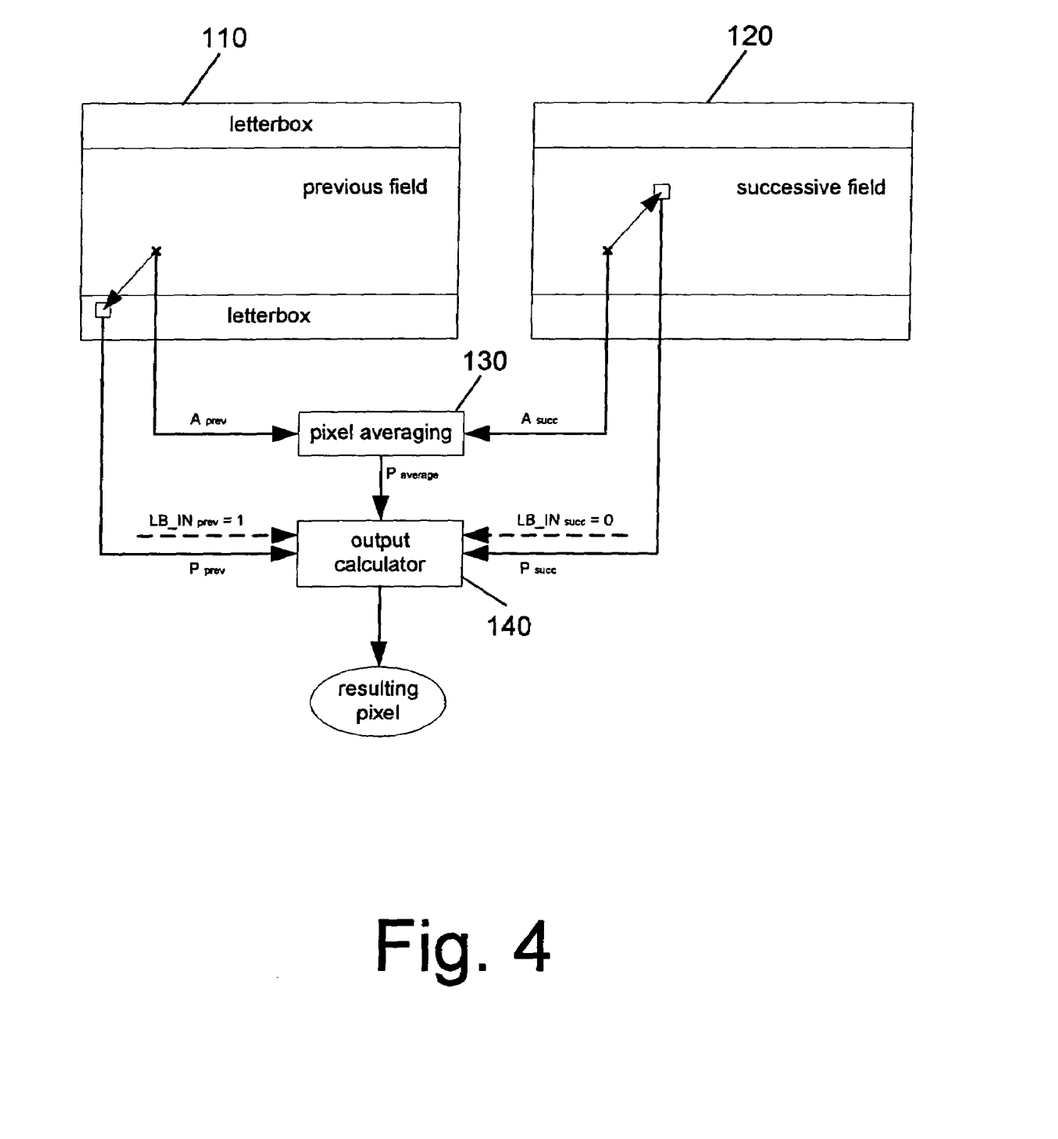
FIG. 4 illustrates an example configuration of a motion compensator in accordance with the present invention.

An example configuration of an interpolator in accordance with the present invention is illustrated in FIG. 4. Image data from two subsequent images 110, 120 is taken into account for generating new image data of an intermediate image which is positioned between images 110 and 120 in temporal respect. Both referenced image data at positions $P_{prev}$, $P_{succ}$ are supplied to an output calculator 140. In addition, output calculator 140 receives the LB_IN signals for the referenced image data positions, in other words, $LB\_IN_{prev}$, $LB\_IN_{succ}$. Based on the received LB_IN signals, the output calculator 140 determines which of the referenced image data is taken into account for generating the new image data of the intermediate image.

According to the illustrated example, the image data referenced in the previous field 110 cross the borderline between the active image area 10 and the bottom letterbox area 30. These image data should not be taken into account during interpolation in order to preserve a high picture quality of the resulting image. As indicated by the $LB\_IN_{prev}$ signal having a value of 1, in other words, indicating a letterbox pixel position, the letterbox image data is not taken into account during interpolation. In contrast, the output calculator receives a 0 value associated to the image data of the successive field 120 indicating an active image area pixel position. Accordingly, these image data is taken into account during interpolation.

As the image data from the previous field are considered to be impermissible for motion compensation, output calculator 140 applies a concealment algorithm in order to determine replacement data. According to a first embodiment, the impermissible data are replaced by those image data referenced in the other field. As shown in the illustrated embodiment, the referenced image data of the successive field 120 replaces the image data referenced in the previous field 110. Output calculator 140 calculates interpolated image data based only on image data of a single input field 120.

In addition to the image data referenced by the motion vectors, the interpolator illustrated in FIG. 4 takes image data from the previous and successive fields 110, 120 into account which are located at a position A. This image position A corresponds to that of the currently generated image data. The respective image data $A_{prev}, A_{succ}$ are applied to a pixel averaging unit 130 calculating a mean value of the received image data in accordance with the temporal position of the current image and providing the average result $P_{average}$ to output calculator 140. Output calculator 140 takes the averaged image data $P_{average}$ into account during interpolation.

The average image data $P_{average}$ can be used according to an alternative embodiment as replacement data if the referenced image data of one of the images turn out to be impermissible for interpolation. It is also used as a fallback value in case of an unreliable motion vector.

Figure 5:
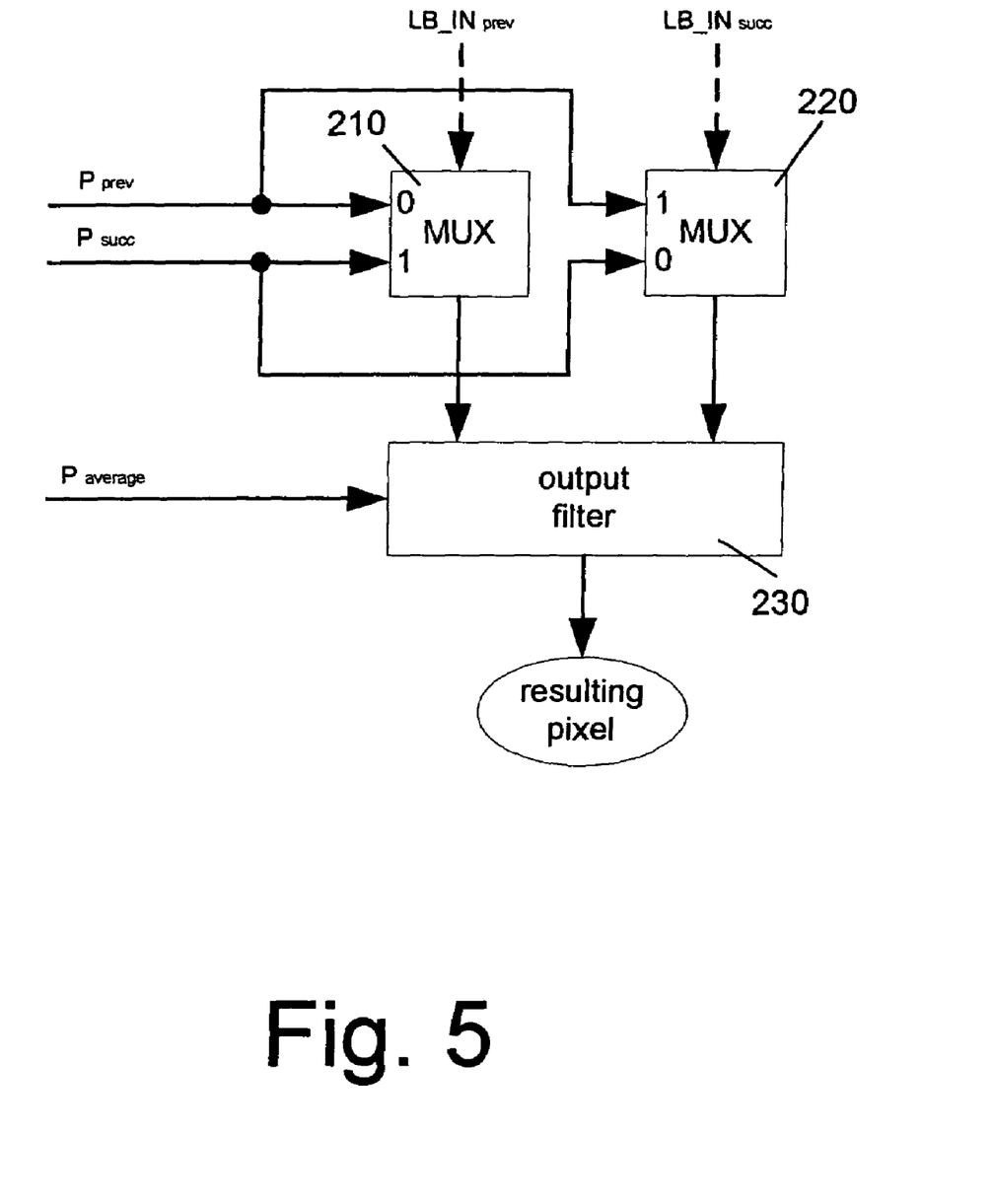
FIG. 5 illustrates an example configuration of the output calculator of the motion compensator shown in FIG. 4.

Further, the interpolation algorithm performed by output calculator 140 takes the averaged image data $P_{average}$ into account in addition to the referenced image data $P_{prev}, P_{succ}$. The three different image data are provided to the output filter 230. In a selected embodiment, the output filter includes a 3 tap median. In case of a reliable motion vector both referenced image data $P_{prev}, P_{succ}$ contain nearly the same pixel value resulting from the same moving object in the previous and successive image. Consequently, one of these referenced image data is the result of median filter. The averaged image data $P_{average}$ serves as a fallback solution if the motion vector is wrong or unreliable. In this case, the three median inputs differ considerably, and the averaged image data $P_{average}$ mostly builds the median output. Neglectable motion blur is generated instead of wrong interpolated image content. An example configuration of output calculator 140 is illustrated in FIG. 5. While output filter 230 combines the referenced image data from the previous field, $P_{prev}$, the successive field $P_{succ}$ and the averaged image data $P_{average}$ in accordance with the predefined interpolation algorithm, the selection of the appropriate motion compensated image data $P_{prev}, P_{succ}$ is performed by multiplexers 210, 220. Each multiplexer 210, 220 is controlled by one of the LB_IN signals. Each of the multiplexers 210, 220 is responsible for one of the referenced images. Depending on the status of the respective LB_IN signal, the multiplexer 210, 220 either selects the motion compensated image data $P_{prev}, P_{succ}$ or selects the respective replacement data, in other words, the motion compensated data from the other referenced image if the motion compensated data references an impermissible image area. Each multiplexer 210, 220 applies the selected image data to output filter 230. Output filter 230 generates the new image data based on the received motion compensated image data and the averaged pixel data $P_{average}$. In case of replacement, two of three input data of the output filter 230 are equal and consequently build the generated output.

Figure 2:
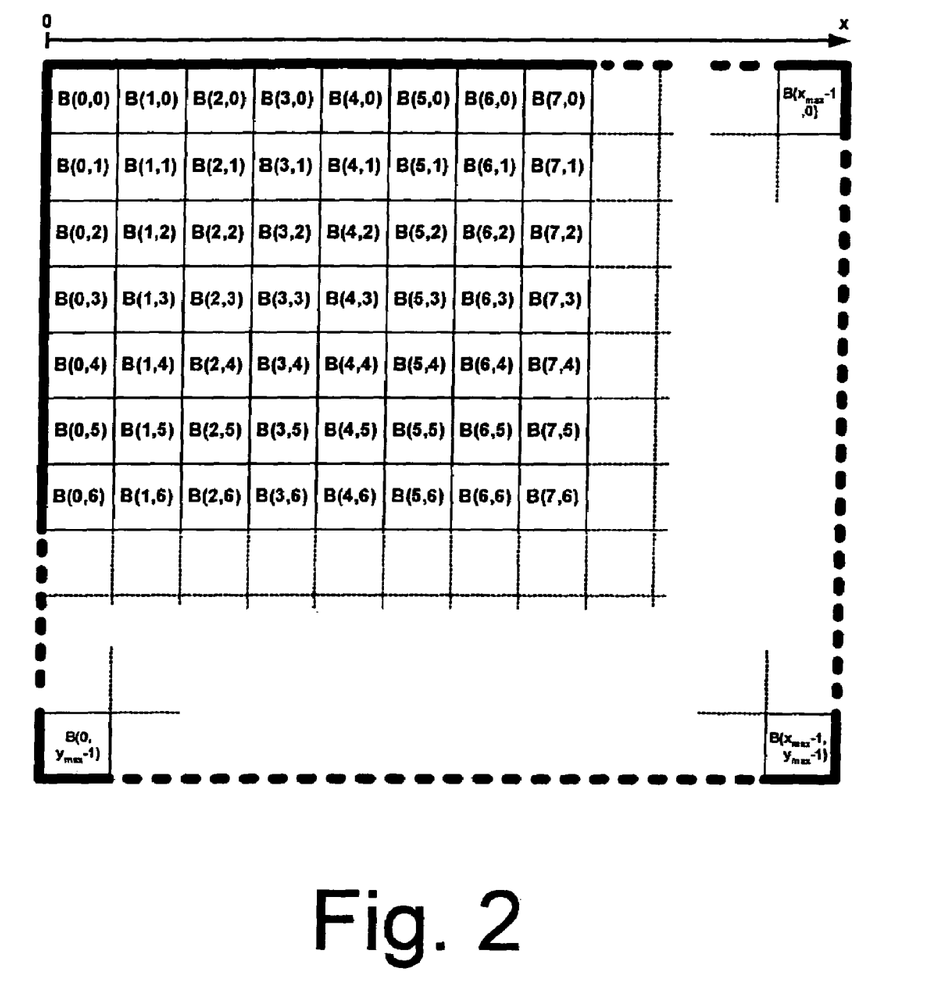
FIG. 2 illustrates the division of a video image into a plurality of blocks of a uniform size.

Although in the previous description, the motion compensation and interpolation are mainly described with respect to "image data" this expression includes an implementation in accordance with FIG. 2, in other words, based on predefined blocks within each image, or a pixel based implementation. Alternatively, both implementation, namely on a block basis and on a pixel basis, may be combined in that the motion compensation is performed on a block basis while the individual selection of the respective image data used for interpolation is performed on a pixel basis from the block based motion compensated image data.

While the previously described embodiments mainly relate to letterbox type images as illustrated in FIG. 1 having black bars at the top and bottom of the display screen, the present invention can be applied with the same effect to a respective image type having black bars at the left and right borders or to standard images without having black bars at the image borders.

Standard type images as well as the active image area of the letterbox type images may have motion vectors assigned to image data in proximity to the image borders which are calculated based on improved motion estimation algorithms replacing conventional best match motion estimation algorithms. Motion estimation and especially an improved estimation of motion vectors for obtaining the above mentioned line or column vectors is described next.

Generally, motion estimation is performed on a block raster as illustrated in FIG. 2. Each video image of the video sequence is divided into blocks of a uniform size for motion vector estimation. Generally, each block has a square shape of 8×8 pixels. It is to be noted that a skilled person is aware of applying blocks of a different size for instance, for 4×4 or 16×16 or even of an irregular rectangular shape having a different height and width.

Motion vectors for a current image are usually determined based on a best match approach. However, the best match approach fails at the image borders, in particular when no corresponding block exists in the previous image. Under such circumstances, a motion vector estimation based on conventional estimation algorithms is replaced by a line or column motion vector assigning the predominant motion of the complete line or column to a current block in proximity to the image borders.

As soon as the motion vector determination for a current image n (field or frame) has been completed, the calculation of respective line and column vectors is started. The calculated line and column vectors are provided for use during motion estimation of the next field or frame.

First, motion vectors of a minor length are excluded from being taken into account. For this purpose, the motion vector $\vec{v}$ of each block is compared to a predefined threshold value $v_{thr}$. The result therefore is reflected in a binary "vecthr" flag assigned to each of the blocks. This flag is calculated as indicated by equation (3):

$$vecthr[(x, y), n] = \begin{cases} 1, & \text{if } (\vec{v}[(x, y), n] > \vec{v}_{thr}) \\ 0, & \text{else} \end{cases} \quad (3)$$

Preferably, the set of motion vectors determined for all blocks of image n is revised accordingly such that those motion vectors are set to zero (0;0) which do not exceed the predefined threshold value $v_{thr}$. This revision is reflected by equation (4):

$$\vec{v}_{thresholded}[(x,y),n] = \begin{cases} \vec{v}[(x,y),n], & \text{if } (vecthr[(x,y),n] > 0) \\ (0;0), & \text{else} \end{cases} \quad (4)$$

In accordance with equation (4), a thresholded vector $\vec{v}_{thresholded}$ is calculated. The thresholded vector is set to zero if the previously calculated flag (cf. equation (3)) is zero. Otherwise, the determined vector $\vec{v}$ is assigned to the thresholded vector $\vec{v}_{thresholded}$.

For the calculation of a line or column vector, preferably a mean value of the remaining (thresholded) vectors is calculated. However, a skilled person may apply any other algorithm in order to determine a motion vector representing a common motion vector for a plurality of individual motion vectors of a line or column. For the line and column vector calculation, the individual block lengths and the number of blocks exceeding the threshold value $v_{thr}$ are accumulated as indicated by the following equations (5) to (8):

$$\vec{v}_{sum\_line}(y) = \sum_{x=0}^{x_{max}-1} \vec{v}_{thresholded}[(x,y),n] \quad (5)$$

$$\vec{v}_{sum\_column}(x) = \sum_{y=0}^{y_{max}-1} \vec{v}_{thresholded}[(x,y),n] \quad (6)$$

$$n_{sum\_line}(y) = \sum_{x=0}^{x_{max}-1} vecthr[(x,y),n] \quad (7)$$

$$n_{sum\_column}(x) = \sum_{y=0}^{y_{max}-1} vecthr[(x,y),n] \quad (8)$$

The line and column vectors $\vec{v}_{line}$, $\vec{v}_{column}$ are calculated in accordance with the following equations (9) and (10). A motion vector is only calculated if the number of blocks exceeding the predetermined threshold $v_{thr}$ for a line or column exceeds another predefined threshold $nthr_{line}$, $nthr_{column}$.

$$\vec{v}_{line}[(y),n] = \begin{cases} \frac{\vec{v}_{sum\_line}(y)}{n_{sum\_line}(y)}, & \text{if } (n_{sum\_line}(y) > nthr_{line}) \\ (0;0), & \text{else} \end{cases} \quad (9)$$

$$\vec{v}_{column}[(x),n] = \begin{cases} \frac{\vec{v}_{sum\_column}(x)}{n_{sum\_column}(x)}, & \text{if } (n_{sum\_column}(x) > nthr_{column}) \\ (0;0), & \text{else} \end{cases} \quad (10)$$

Referring to the above-mentioned thresholds $v_{thr}$, $nthr_{line}$, $nthr_{column}$, preferably the following values are employed:

$\vec{v}_{thr} = 4$ $nthr_{line} = x_{max}/2$ (45 for PAL standard and $X=8$)

$nthr_{column} = y_{max}/2$ (36 for PAL standard and $Y=8$)

wherein $x_{max}$ and $y_{max}$ represent the total width/height of a field or frame. The values are preferably employed for a block size of 8×8 pixels.

While the above description is based on the assumption that line and column vectors are calculated for each individual line and column, a common motion vector may additional or alternatively be calculated for combinations of two lines or two columns. A two-line or two-column motion vector may further increase the motion accuracy for objects representing the predominant motion within two lines or two columns.

A particular example for applying the described example implementation of a motion compensated interpolator is described next. During frame rate up-conversion from 50 Hz to 100 Hz, an intermediate image is generated at a central position in temporal respect between two subsequent images. A current pixel position is assumed to be:

X_OUT=100 and Y_OUT=245.

The motion vector received for motion compensation of this pixel position has the following vertical and horizontal components:

V=20 and H=10.

Further, it is assumed that the last active line LAL in the letterbox type image is 250.

In order to reference pixels in both respective input images, namely the previous and the subsequent images, the received motion vector is divided in accordance with the temporal relation of the output image to be generated compared to the two referenced input images. As the intermediate image of the described example is positioned just in the center of both input images, the respective motion vectors calculated for motion compensation from the previous and successive images are determined as follows applying a weighing factor of ½:

V_PREV=-½*V=-½*20=-10;

H_PREV=-½*H=-½*10=-5;

V_SUCC=+½*V=+½*20=+10;

H_SUCC=+½*H=+½*10=+5;

Based on the above calculated motion vectors, the pixel positions in the referenced images are calculated as follows:

P_PREV: X_VEC_PREV=X_OUT+H_PREV=100+(-5)=95

Y_VEC_PREV=Y_OUT+V_PREV=245+(-10)=235

P_SUCC: X_VEC_SUCC=X_OUT+H_SUCC=100+5=105

Y_VEC_SUCC=Y_OUT+V_SUCC=245+10=255

Accordingly, the pixel for pixel position $P_{prev}$ (95; 235) and $P_{succ}$ (105;255) are referenced to provide image data for the generation of a new pixel in the current intermediate image.

Before the intermediate image data is generated, it is determined whether or not the referenced image data fall into the letterbox area 20, 30. For this purpose, the vertical component of the referenced pixel position is compared to the predefined borderline LAL, in other words, the last active line of the active image area 10:

Y_VEC_PREV=235<LAL=250

It now turns out that the pixel referenced in the previous image is part of the active image area 10.

In order to successfully perform an interpolation with this pixel, it has to be determined whether or not the current pixel position is also part of the active image area 10 or part of one of the letterbox areas 20, 30:

Y_OUT=245<LAL=250

As both pixel positions, in other words, the current pixel and pixel reference in the previous image, are located within the active image area, the referenced pixel can be used for interpolation purposes. Consequently, the signal LB_IN is set to zero (indicating that the referenced pixel positions are located within the active image area).

Applying the above determination to the pixel referenced in the successive image $P_{succ}$ (105; 255):

Y_VEC_SUCC=255>LAL=250

Y_OUT=245<LAL=250

Accordingly, the motion compensated image data from the successive image refers to image data of the letterbox area while the current pixel is positioned within the active image area. Consequently, the signal LB_IN is set to 1, in other words, interpolation is inhibited. As the signal LB_IN is set to 1, output calculator 140 inhibits an interpolation based on the referenced pixel value and replaces these image data by those of the other referenced pixel $P_{prev}$.

The intermediate image is positioned with equal temporal distance to the previous and subsequent images 110, 120. Consequently, the motion vector calculation and the interpolation employ a weighing factor of ½. Depending on the temporal position of the intermediate image with respect to the referenced images, other weighing factors may be employed, for instance ⅓*$P_{prev}$ and ⅔*$P_{succ}$.

Summarizing, the present invention relates to an improved interpolation based on motion compensation. In order to avoid interpolation artefacts in proximity to the image borders, in particular in letterbox type images, each motion compensated image data is subjected to a position validation in order to determine whether or not the motion compensated image data can be used for interpolation purposes. By comparing the position of the motion compensated image data in the referenced images with predefined borderlines, impermissible image data positions can be detected and interpolation based on such image data prevented.

The invention claimed is:

1. A method for generating image data based on motion compensation from video data of other images in a sequence of video images, the method comprising:
   receiving a motion vector indicating amplitude and direction of a motion at a current image position of the image to be generated;
   obtaining image data from another image referenced based on the motion vector;
   determining whether or not the image data referenced based on the motion vector being at a permissible image position; and
   inhibiting the generation of new image data based on the referenced image data if the referenced image data is positioned at an impermissible image position.

2. A method according to claim 1, wherein said determining includes comparing the position of the referenced image data to predefined borders of a permissible image area.

3. A method according to claim 2, wherein said determining further includes comparing the position of the current image data to the predefined borders of the permissible image area.

4. A method according to claim 2, wherein the permissible image area is the active image area of a video image.

5. A method according to claim 4, wherein the impermissible image area includes image portions inserted for adapting an image format to a display format.

6. A method according to claim 2, wherein the images are letterbox images and the impermissible image area is black bars provided at the top and bottom of a display format.

7. A method according to claim 1, further comprising replacing the impermissible image data with replacement image data.

8. A method according to claim 7, wherein the replacement image data is taken from the referenced image data at a permissible position.

9. A method for generating image data based on motion compensation from video data of other images in a sequence of video images the method comprising:
   receiving a motion vector indicating amplitude and direction of a motion at a current image position of the image to be generated;
   obtaining image data from another image referenced based on the motion vector;
   determining whether or not the image data referenced based on the motion vector being at a permissible image position; and inhibiting the generation of new image data based on the referenced image data if the referenced image data is positioned at an impermissible image position;
   calculating two motion vectors from the received motion vector which reference different images;
   obtaining image data of the referenced images in accordance with the calculated motion vectors; and
   interpolating the obtained image data referenced by both of the motion vectors.

10. A method according to claim 9, wherein the two motion vectors reference the two images adjacent to the current image in the image sequence.

11. A method according to claim 9, wherein the two motion vectors reference different images prior to the current image in the image sequence.

12. A method according to claim 9, wherein said calculating calculates the length of both of the motion vectors in accordance with the temporal position of the current image with respect to both of the referenced images.

13. A method according to claim 9, further comprising replacing the impermissible image data from the referenced image by replacement image data from the other referenced image.

14. A method according to claim 13, wherein the replacement image data is the image data referenced in the other image.

15. A method according to claim 9, wherein said interpolating further including receiving image data from a position in the referenced images corresponding to the current position.

16. A method according to claim 1, wherein said determining generates a signal indicating the permissibility of the referenced image data.

17. A method according to claim 16, wherein said inhibiting selecting the referenced image data taken into account for generating new image data based on the signal generated by said determining.

18. A method according to claim 1, wherein the new image data is generated on a pixel basis.

19. A method according to claim 1, wherein the new image data is generated on a block basis.

20. A motion compensator for generating image data based on motion compensation from video data of other images in a sequence of video images, the motion compensator being adapted to receive a motion vector indicating amplitude and direction of a motion at a current position in the image to be generated and to retrieve image data from another image referenced based on the motion vector, said motion compensator comprising:

an output calculator for determining whether or not the image data referenced based on the motion vector being at a permissible image position, and for inhibiting the generation of new image data based on the referenced image data if the referenced image data is positioned at an impermissible image position.

21. A motion compensator according to claim 20, wherein said output calculator includes a comparator for comparing the referenced image data position to predefined borders of a permissible image area.

22. A motion compensator according to claim 21, wherein said output calculator includes a comparator for comparing the current image data position to the predefined borders of the permissible image area.

23. A motion compensator according to claim 21, wherein the permissible image area is the active image area of a video image.

24. A motion compensator according to claim 23, wherein the impermissible image area includes image portions inserted for adapting an image format to a display format.

25. A motion compensator according to claim 20, wherein the images are letterbox images and the impermissible image area is black bars provided at the top and bottom of a displayed image area.

26. A motion compensator according to claim 20, wherein said output calculator replaces the impermissible image data of the referenced block with replacement image data.

27. A motion compensator according to claim 26, wherein said output calculator retrieves the replacement image data from the referenced image at a permissible position.

28. A motion compensator for generating image data based on motion compensation from video data of other images in a sequence of video images the motion compensator being adapted to receive a motion vector indicating amplitude and direction of a motion at a current position in the image to be generated and to retrieve image data from another image referenced based on the motion vector, said motion compensator comprising:

an output calculator for determining whether or not the image data referenced based on the motion vector being at a permissible image position and for inhibiting the generation of new image data based on the referenced image data if the referenced image data is positioned at an impermissible image position, wherein said output calculator calculates two motion vectors from the received motion vector which reference different images, retrieves the image data of the referenced images in accordance with the calculated motion vectors, and interpolates the retrieved image data referenced by both of the motion vectors.

29. A motion compensator according to claim 28, wherein the two motion vectors reference the two images adjacent to the current image in the image sequence.

30. A motion compensator according to claim 28, wherein the two motion vectors reference different images prior to the current image in the image sequence.

31. A motion compensator according to claim 28, wherein said output calculator calculates the length of both of the motion vectors in accordance with the temporal position of the current image with respect to both of the referenced images.

32. A motion compensator according to claim 28, wherein said output calculator replaces the impermissible image data from the referenced image by replacement image data from the other referenced image.

33. A motion compensator according to claim 32, wherein the replacement image data is the image data referenced in the other image.

34. A motion compensator according to claim 28, further comprising:

a pixel averaging unit for generating averaged image data from a position in the referenced images corresponding to the current position by weighing those images according to the temporal position of the current image with respect to the referenced images and forwarding the averaged image data to said output calculator.

35. A motion compensator according to claim 34, wherein said output calculator the received averaged image data into the interpolation of new image data.

36. A motion compensator according to claim 20, wherein said output calculator further receives a signal indicating the permissibility of the referenced image data.

37. A motion compensator according to claim 36, wherein said output calculator selects the referenced image data taken into account for generating new image data based on the received signal.

* * * * *